US011231263B2

(12) United States Patent
Phipps et al.

(10) Patent No.: US 11,231,263 B2
(45) Date of Patent: Jan. 25, 2022

(54) WEARABLE COORDINATE MEASUREMENT DEVICES

(71) Applicant: FARO Technologies, Inc., Lake Mary, FL (US)

(72) Inventors: James P. Phipps, Sorrento, FL (US); Chad Crisostomo, Lake Mary, FL (US); Fabiano Kovalski, Sanford, FL (US); Nicholas Nicou, Tavares, FL (US); Jeremy W. Mares, Lake Mary, FL (US); Dragos Stanescu, Lake Mary, FL (US); Kishore Lankalapalli, Sanford, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 11 days.

(21) Appl. No.: 16/936,887

(22) Filed: Jul. 23, 2020

(65) Prior Publication Data
US 2021/0033378 A1    Feb. 4, 2021

Related U.S. Application Data

(60) Provisional application No. 62/882,225, filed on Aug. 2, 2019.

(51) Int. Cl.
| | | |
|---|---|---|
| *G01B 5/008* | (2006.01) | |
| *G06F 3/01* | (2006.01) | |
| *G06F 1/16* | (2006.01) | |
| *G01B 21/04* | (2006.01) | |

(52) U.S. Cl.
CPC .......... *G01B 5/008* (2013.01); *G06F 1/163* (2013.01); *G06F 3/014* (2013.01); *G01B 21/04* (2013.01)

(58) Field of Classification Search
CPC ...................................................... G01B 5/008
USPC ................................................ 33/1 PT, 503
See application file for complete search history.

(56) References Cited

U.S. PATENT DOCUMENTS

| | | | |
|---|---|---|---|
| 5,402,582 A | 4/1995 | Raab | |
| 5,611,147 A | 3/1997 | Raab | |
| 6,834,436 B2 * | 12/2004 | Townsend | A61B 5/1116 33/341 |
| 7,797,849 B2 * | 9/2010 | Gomez | G01B 5/004 33/503 |
| 9,163,921 B2 * | 10/2015 | Tait | G01B 11/005 |
| 9,594,250 B2 * | 3/2017 | Tait | G01B 11/005 |
| 9,829,305 B2 * | 11/2017 | Gong | G01B 7/012 |
| 10,036,627 B2 * | 7/2018 | Ferrari | G01B 21/047 |
| 10,663,274 B2 * | 5/2020 | Creachbaum | G01B 5/012 |
| 11,054,237 B2 * | 7/2021 | Sajedi | G01B 5/008 |
| 2015/0330766 A1 * | 11/2015 | Gong | G06F 8/65 33/503 |
| 2021/0116227 A1 * | 4/2021 | Sajedi | G01B 5/0014 |

* cited by examiner

*Primary Examiner* — George B Bennett
(74) *Attorney, Agent, or Firm* — Cantor Colburn LLP

(57) ABSTRACT

Wearable coordinate measurement devices are described. The wearable coordinate measurement devices include a wearable member and a measurement portion attached to the wearable member. The measurement portion includes a first rotary measurement device, a first probe linkage having a first probe tip on an end thereof, and a second probe linkage having a second probe tip on an end thereof. The first rotary measurement device is configured to detect a separation distance between the first probe tip and the second probe tip.

24 Claims, 8 Drawing Sheets

WEARABLE COORDINATE MEASUREMENT DEVICES

CROSS REFERENCE TO RELATED APPLICATIONS

This application claims the benefit of U.S. Provisional Application Ser. No. 62/882,225, filed Aug. 2, 2019, the entire disclosure of which is incorporated herein by reference.

BACKGROUND

The present disclosure relates to coordinate measuring systems, and in particular to wearable coordinate measurement devices.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive, and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ('582), which is incorporated herein by reference in its entirety. The '582 patent discloses a 3-D measuring system comprised of a manually-operated AACMM having a support base on one end and a measurement probe at the other end. Commonly assigned U.S. Pat. No. 5,611,147 ('147), which is incorporated herein by reference in its entirety, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

Although AACMM and other coordinate measuring devices trackers are generally suitable for their intended purpose, some limitations still exist in tracker complexity, maintenance, resistance to shock, identification of target objects, and portability. For example, at times, it may be beneficial and/or required to have a moveable or mobile a coordinate measurement device. When moving a coordinate measurement device, the coordinate system may require resetting or recalibration. Further, limitations in an ability to move an arm of an AACMM may limit the scope of what can be scanned or may increase scan times due to shifting an orientation of a scanned object relative to the AACMM. What is needed is a coordinate measurement device having features to overcome these limitations and provide other features and/or functionality thereto.

BRIEF DESCRIPTION

According to some embodiments of the present disclosure, wearable coordinate measurement devices are provided. The wearable coordinate measurement devices include a wearable member and a measurement portion attached to the wearable member. The measurement portion includes a first rotary measurement device, a first probe linkage having a first probe tip on an end thereof, and a second probe linkage having a second probe tip on an end thereof. The first rotary measurement device is configured to detect a separation distance between the first probe tip and the second probe tip.

In addition to one or more of the features described in one or more of the above embodiments, further embodiments of the wearable coordinate measurement devices may include that the first rotary measurement device defines a pivot and the first and second probe linkages are arranged to rotate about the pivot and wherein the measurement device is configured to measure and angle between the first probe linkage and the second probe linkage relative to the pivot.

In addition to one or more of the features described in one or more of the above embodiments, further embodiments of the wearable coordinate measurement devices may include a second rotary measurement device, wherein the first probe linkage is movably attached to the first rotary measurement device and the second probe linkage is movable attached to the second rotary measurement device.

In addition to one or more of the features described in one or more of the above embodiments, further embodiments of the wearable coordinate measurement devices may include a connecting linkage fixedly connecting the first rotary measurement device to the second rotary measurement device.

In addition to one or more of the features described in one or more of the above embodiments, further embodiments of the wearable coordinate measurement devices may include a plurality of additional measurement devices arranged between the first probe linkage and the second probe linkage.

In addition to one or more of the features described in one or more of the above embodiments, further embodiments of the wearable coordinate measurement devices may include that the wearable member is sized to fit an operator's hand.

In addition to one or more of the features described in one or more of the above embodiments, further embodiments of the wearable coordinate measurement devices may include that the measurement portion is integrally formed with the wearable member.

In addition to one or more of the features described in one or more of the above embodiments, further embodiments of the wearable coordinate measurement devices may include that the measurement portion is fixedly attached to the wearable member.

In addition to one or more of the features described in one or more of the above embodiments, further embodiments of the wearable coordinate measurement devices may include that the measurement portion is removably attached to the wearable member.

In addition to one or more of the features described in one or more of the above embodiments, further embodiments of the wearable coordinate measurement devices may include that the first probe linkage is formed from at least one of aluminum, magnesium, and carbon fiber.

In addition to one or more of the features described in one or more of the above embodiments, further embodiments of the wearable coordinate measurement devices may include a controller operably connected to the first rotary measurement device, the controller configured to receive data from the first rotary measurement device.

In addition to one or more of the features described in one or more of the above embodiments, further embodiments of the wearable coordinate measurement devices may include that the controller is mounted to the wearable member.

In addition to one or more of the features described in one or more of the above embodiments, further embodiments of the wearable coordinate measurement devices may include at least one linkage sensor, the linkage sensor configured to detect a characteristic of the first probe linkage.

In addition to one or more of the features described in one or more of the above embodiments, further embodiments of the wearable coordinate measurement devices may include that the at least one linkage sensor is embedded within the first probe linkage.

In addition to one or more of the features described in one or more of the above embodiments, further embodiments of the wearable coordinate measurement devices may include that the at least one linkage sensor is a thermal sensor.

In addition to one or more of the features described in one or more of the above embodiments, further embodiments of the wearable coordinate measurement devices may include at least one auxiliary component attached to the wearable member.

In addition to one or more of the features described in one or more of the above embodiments, further embodiments of the wearable coordinate measurement devices may include that the at least one auxiliary component comprises at least one tracking element.

In addition to one or more of the features described in one or more of the above embodiments, further embodiments of the wearable coordinate measurement devices may include that the at least one tracking element is detectable to enable monitoring a position of the wearable member within a three dimensional coordinate space.

In addition to one or more of the features described in one or more of the above embodiments, further embodiments of the wearable coordinate measurement devices may include that the at least one auxiliary component comprises at least one of an electrical connector, a communication connector, and an interface connector.

In addition to one or more of the features described in one or more of the above embodiments, further embodiments of the wearable coordinate measurement devices may include that the at least one auxiliary component enables integration with an articulated arm coordinate measuring machine.

In addition to one or more of the features described in one or more of the above embodiments, further embodiments of the wearable coordinate measurement devices may include that the measurement device comprises an encoder to measure an angle.

In addition to one or more of the features described in one or more of the above embodiments, further embodiments of the wearable coordinate measurement devices may include a battery mounted to the wearable member, the battery configured to supply power to the first rotary measurement device.

In addition to one or more of the features described in one or more of the above embodiments, further embodiments of the wearable coordinate measurement devices may include a preloading mechanism arranged to urge the first probe tip toward the second probe tip.

In addition to one or more of the features described in one or more of the above embodiments, further embodiments of the wearable coordinate measurement devices may include that the preloading mechanism is a clock spring arranged within the first rotary measurement device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
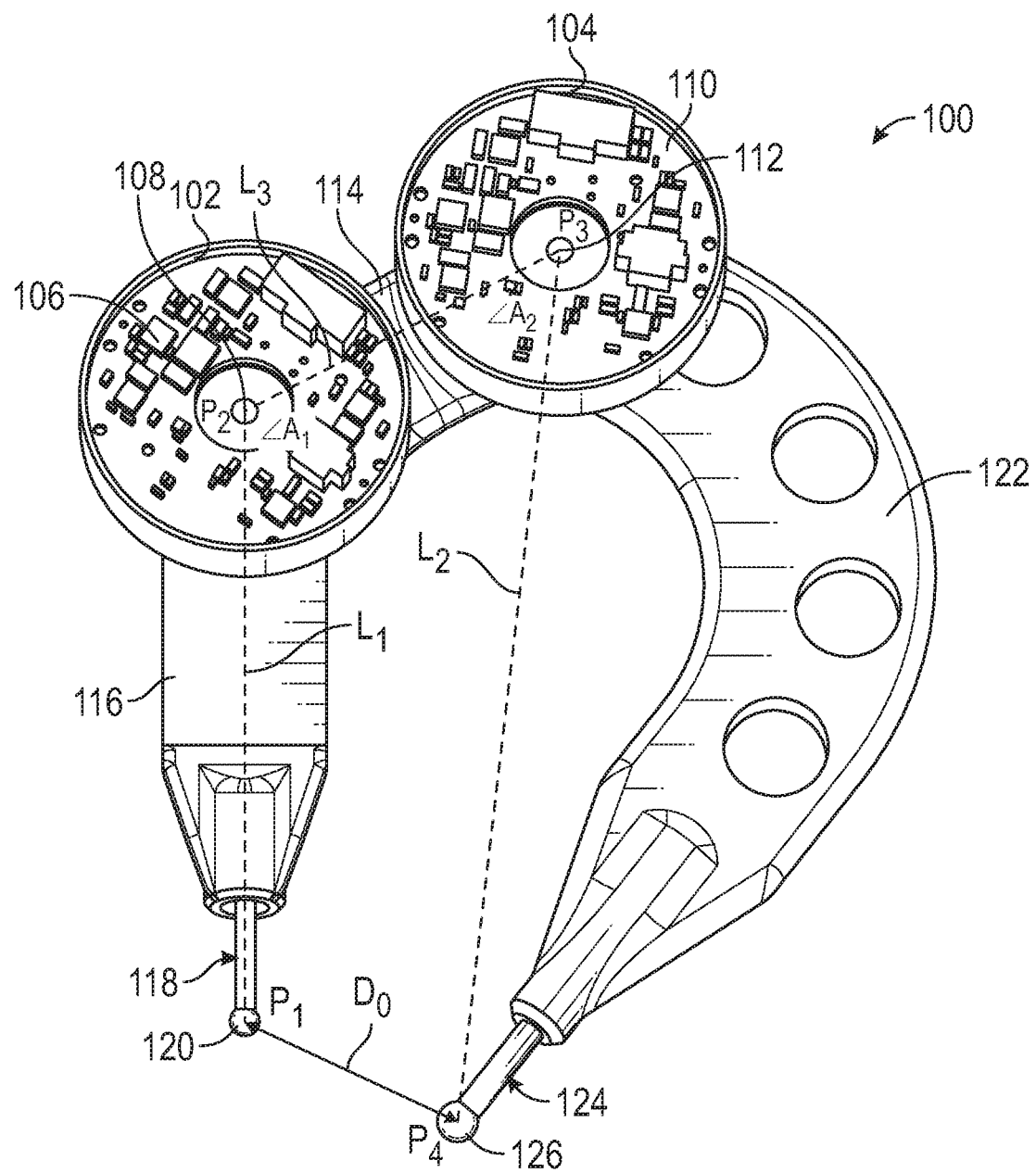
FIG. 1 is a schematic illustration of a wearable coordinate measurement device in accordance with an embodiment of the present disclosure.

The detailed description explains embodiments of the invention, together with advantages and features, by way of example with reference to the drawings.

DETAILED DESCRIPTION

Some embodiments of the present disclosure provide for a wearable coordinate measurement system or coordinate measurement device. The wearable coordinate measurement device may be a glove or other wearable device and/or may be attachable to a user to be worn (e.g., through a harness or similar strap-type attachment). Embodiments of the invention provide advantages in versatility, efficiency, and mobility for coordinate measurement devices and systems. Specifically, in accordance with some embodiments, a user's hand becomes integrated into a coordinate system by wearing the wearable, thus enabling access to various areas of a measured device not necessarily previously available when, for example, using an AACMM. Moreover, embodiments of the present disclosure may reduce set-up and break-down times associated with measuring objects.

As discussed herein, measurement devices of the present disclosure can include a measurement probe assemblies or devices, which may include encoders or similar measurement components/elements. For example, in some embodiments, measurement probe assemblies of the present disclosure may include an optical encoder, although other encoders may be employed without departing from the scope of the present disclosure. In some embodiments, measurement probe assemblies may include a rotary encoder having a read head and an optical disk having index marks. In some configurations, the measurement probe assemblies can include one or more read heads and a grating disk. In some such embodiments, two read heads (i.e., a pair) may be positioned on a read head connector board. The connector board is attached via fasteners to a mounting plate. The grating disk, of such embodiments, may be attached to a rotatable shaft, for example by use of an adhesive, and is spaced apart from and in alignment with the read heads. As such, the measurement probe assemblies may be configured to measure a rotational angle or movement associated with a rotation. The measurement of rotation can enable determination of a location of an object within a coordinate system. Although described with a specific configuration, those of skill in the art will appreciate that other types of measurement probe assemblies and/or devices may be implemented and employed in embodiments of the present disclosure, without departing from the scope thereof.

As described herein, wearable coordinate measurement devices are provided. The wearable coordinate measurement devices may include measurement probe assemblies, as described above and/or variations thereof. It will be appreciated that in a wearable configuration, the measurement probe assemblies may be miniaturized and/or otherwise reconfigured for application in a wearable set up, e.g., as described and shown herein in some example illustrative embodiments. In some embodiments, the wearable coordinate measurement devices described herein may be able to achieve high accuracy (e.g., approximately 5 microns for a measurement of 150+mm; or an accuracy of about $\pm 3 \times 10^{-3}$%), thus providing a highly accurate and versatile measurement tool for use.

Turning now to FIG. 1, a schematic illustration of a wearable coordinate measurement device 100 is shown. The wearable coordinate measurement device 100 includes a first rotary measurement device 102 and a second rotary measurement device 104. The first and second rotary measurement devices 102, 104 may each include encoders, read heads, rotatable shafts or components, etc., to enable rotational measurements. For example, as shown, the first rotary measurement device 102 includes respective first electronics 106 that are part of a measurement probe assembly to measure rotation about a respective first pivot 108. Similarly, the second rotary measurement device 104 includes respective second electronics 110 that are part of a measurement probe assembly to measure rotation about a respective second pivot 112. The electronics 106, 110 may include, in some embodiments, an encoder for measuring movement and/or rotation. Further, the electronics 106, 110 may be operably connected and/or in communication with each other and/or with an external processing device or system (such as a general purpose computer). Accordingly, data regarding rotation and/or movement may be recorded and monitored, in order to enable measurements in accordance with the present disclosure.

The first rotary measurement device 102 is fixedly connected to the second rotary measurement device 104 by a connecting linkage 114. In some embodiments, the connecting linkage 114 may be a fixed or rigid connection between the first and second rotary measurement devices 102, 104.

Operably connected to the first pivot 108 is a first probe linkage 116, such as a probe arm. At an end of the first probe linkage 116, opposite the first rotary measurement device 102 is a first probe 118. The first probe 118 includes a respective first probe tip 120. Similarly, operably connected to the second pivot 112 is a second probe linkage 122, such as a probe arm. At an end of the second probe linkage 122, and opposite the second rotary measurement device 104, is a second probe 124. The second probe 124 includes a respective second probe tip 126. Each of the first and second probe linkages 116, 122 may be structurally rigid.

The first rotary measurement device 102 is configured to measure movement of the first probe linkage 116 about the first pivot 108. For example, as schematically shown, the first rotary measurement device 102 is configured to measure a first angle $A_1$ that is an angle relative to or between the first probe linkage 116 and the connecting linkage 114. As shown, the first probe tip 120 is located a first length $L_1$ from the first pivot 108, with the first length $L_1$ being the shortest distance between the first probe tip 120 and the first pivot 108 (i.e., a straight line distance).

The second rotary measurement device 104 is configured to measure movement of the second probe linkage 122 about the second pivot 112. For example, as schematically shown, the second rotary measurement device 104 is configured to measure a second angle $A_2$ that is an angle relative to or between the second probe linkage 122 and the connecting linkage 114. As shown, the second probe tip 126 is located a second length $L_2$ from the second pivot 112, with the second length $L_2$ being the shortest distance between the second probe tip 126 and the second pivot 112 (i.e., a straight line distance).

A third length $L_3$ is defined along the connecting linkage 114 and is defined as the shortest distance between the first pivot 108 and the second pivot 112. As such, stated another way, the first angle $A_1$ is an angle between the first length $L_1$ and the third length $L_3$ about the first pivot 108 and the second angle $A_2$ is an angle between the second length $L_2$ and the third length $L_3$ about the second pivot 112. Another way of defining aspects of the wearable coordinate measurement device 100 may be based on points. For example, a first point $P_1$ may be defined at the first probe tip 120, a second point $P_2$ may be defined at the first pivot 108, a third point $P_3$ may be defined at the second pivot 112, and a fourth point $P_4$ may be defined at the second probe tip 126. The points $P_1$-$P_4$ may be part of a coordinate system through which the first and second probe tips 120, 126 may move, and a separation distance $D_0$ may be determined. Each of the points $P_1$-$P_4$ may be precisely known relative to each other, enabling precise and accurate knowledge of the lengths $L_1$-$L_3$. In some embodiments, the points $P_1$-$P_4$ may be defined at specific locations (e.g., within or at the center of a probe tip) that are known, and thus accurate measurements related thereto may be achieved.

That is, the first probe linkage 116 is fixed relative to the first pivot 108 except for rotational movement about the first pivot 108, the second probe linkage 122 is fixed relative to the second pivot 112 except for rotational movement about the second pivot 112, and the first pivot 108 is fixed relative to the second pivot 112. Stated another way, each of the first length $L_1$, the second length $L_2$, and the third length $L_3$ are constant or fixed, and the only variable is the first and second angles $A_1$, $A_2$. By knowing the lengths $L_1$-$L_3$, and measuring the first and second angles $A_1$, $A_2$ using the first and second rotary measurement devices 102, 104, respectively, the separation distance $D_0$ may be calculated.

Depending on a specific application and/or any processing or algorithms connected to and receiving data from the wearable coordinate measurement device 100, the points $P_1$-$P_4$ may be located in the same plane and projected to each respective location on the wearable coordinate measurement device 100. In other embodiments, the points $P_1$-$P_4$ may be located at the specific location of each respective part/location of the wearable coordinate measurement device 100, and thus not located in the same plane. However, in such embodiments, because the lengths $L_1$-$L_3$ are fixed, the calculation of the separation distance $D_0$ may be achieved.

The wearable coordinate measurement device 100 can include a wearable member. For example, the elements and features shown in FIG. 2 may be mounted to, affixed to, otherwise attached to, or integrally formed with a wearable member. In some embodiments, the wearable coordinate measurement device 100 may be removably mounted to, affixed, to, or otherwise attached to the wearable member. The wearable member may be a glove, sleeve, mesh-wearable, brace, rig, etc. In some embodiments of the present disclosure, by wearing the wearable coordinate measurement device 100, a user may articulate the first and second probe linkages 116, 122 to adjust the separation distance $D_0$, thus enabling a distance, length, or other measurement that may be based, in part, on the position of the first probe tip 120 and the second probe tip 126. For example, a user may place the probe tips 120, 126 in contact with an object to be measured, and the measurement devices 102, 104 enable an accurate measurement of the separation distance $D_0$.

Although described as a wearable coordinate measurement device 100, in some embodiments, the coordinate measurement device 100 may be a handheld component that is not worn, but rather is hand operated. That is the structure and device shown in FIG. 1 may be employed as a stand-alone or non-worn/non-wearable device. Further, in some embodiments, the device shown and described with respect to FIG. 1 may be configured to be removably mounted on a wearable element (e.g., a glove), such that the device can be used by free-hand or may be worn.

Figure 2A:
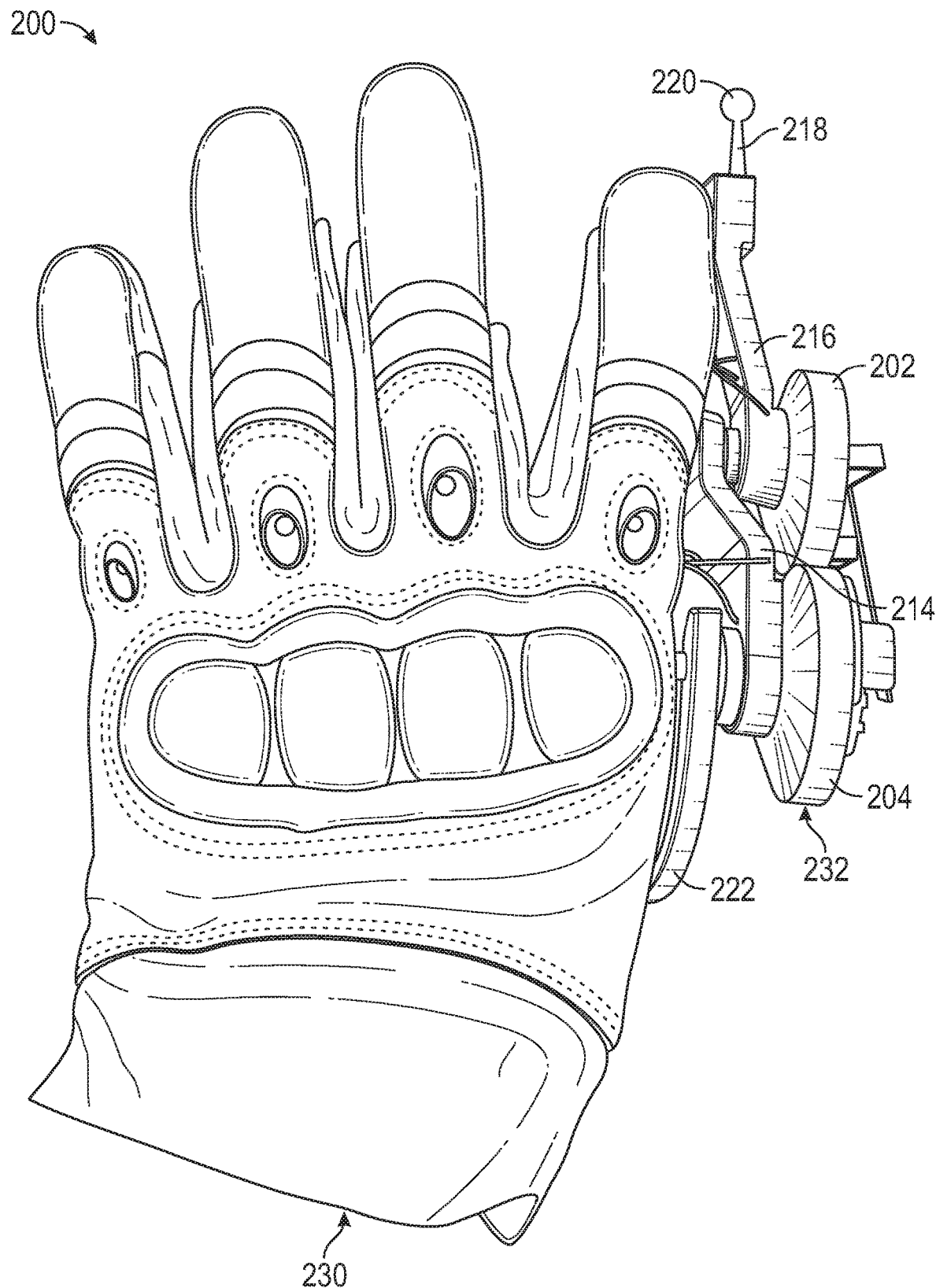
FIG. 2A is a top down schematic illustration of a wearable coordinate measurement device in accordance with an embodiment of the present disclosure.
Figure 2B:
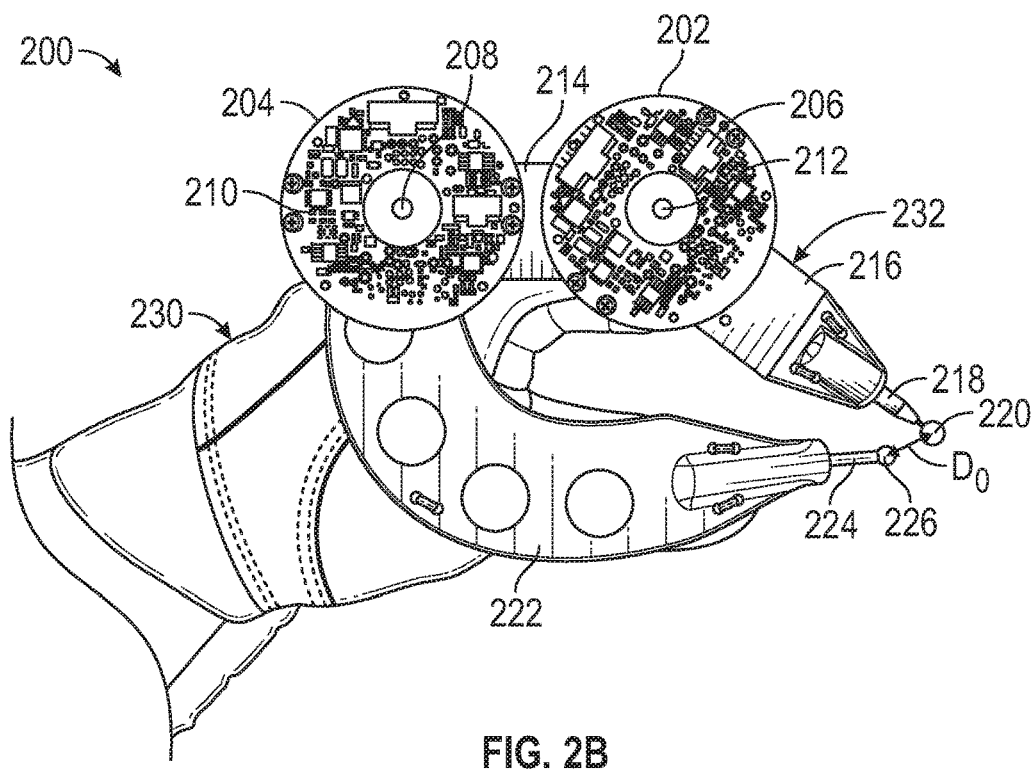
FIG. 2B is a side elevation schematic illustration of the wearable coordinate measurement device of FIG. 2A shown in a first state of operation.
Figure 2C:
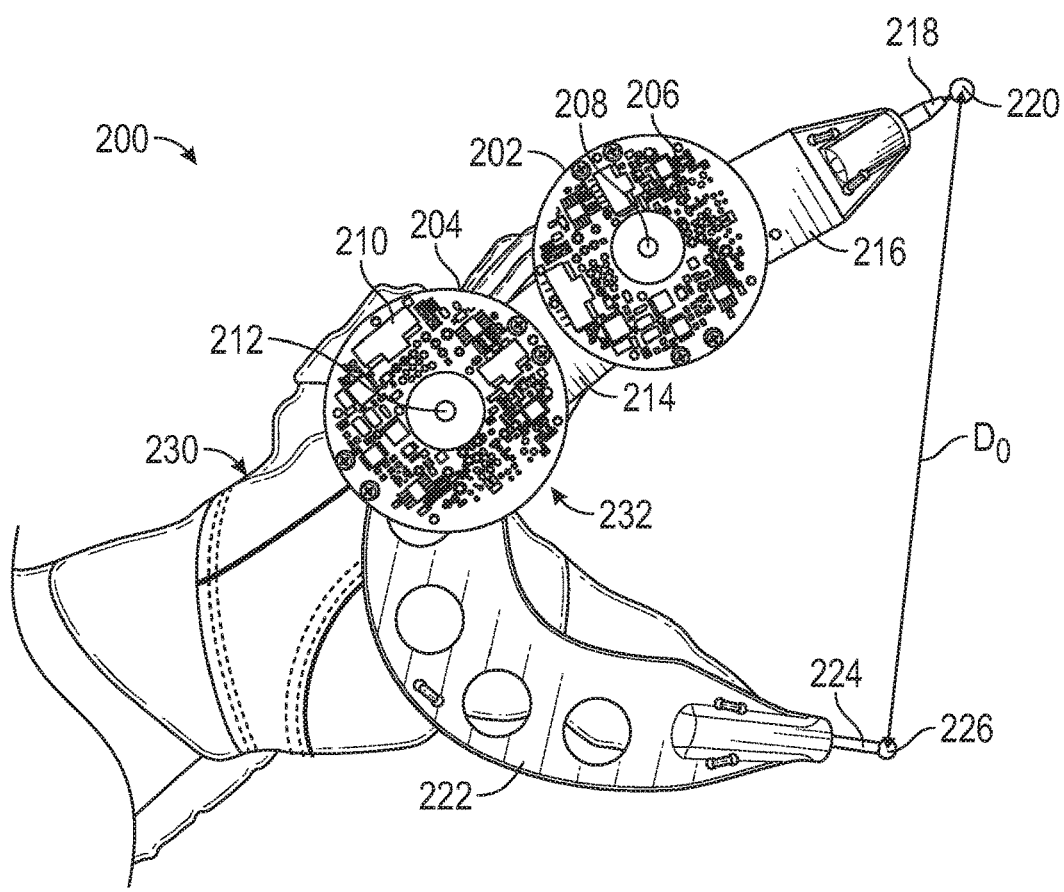
FIG. 2C is a side elevation schematic illustration of the wearable coordinate measurement device of FIG. 2A shown in a second state of operation.

Turning now to FIGS. 2A-2C, schematic illustrations of a wearable coordinate measurement device 200 in accordance with an embodiment of the present disclosure are shown. The wearable coordinate measurement device 200 includes a wearable member 230 and a measurement portion 232. The measurement portion 232 may be substantially similar to the wearable coordinate measurement device 100 shown and described with respect to FIG. 2. FIG. 2A is a plan view illustration of the wearable coordinate measurement device 200, FIG. 2B is a side elevation view of the wearable coordinate measurement device 200 in a first position, and FIG. 2C is a side elevation view of the wearable coordinate measurement device 200 in a second position.

The wearable member 230 of the wearable coordinate measurement device 200 may be a glove or other wearable element/member. In this embodiment, the measurement portion 232 is affixed to the wearable member 230. In other embodiments, the measurement portion 232 may be integrally formed with and/or part of the wearable member 230. Further, in some embodiments, the measurement portion 232 may be removably attached to the wearable member 230, such as by clips, straps, hook-and-loop connection, etc.

Similar to the embodiment shown and described above, the wearable coordinate measurement device 200, and particularly the measurement portion 232, includes a first rotary measurement device 202 and a second rotary measurement device 204. The first rotary measurement device 202 includes respective first electronics 206 to measure rotation about a respective first pivot 208. Similarly, the second rotary measurement device 204 includes respective second electronics 210 to measure rotation about a respective second pivot 212. The electronics 206, 210 may be operably connected and/or in communication with each other and/or with an external processing device or system (such as a general purpose computer). Accordingly, data regarding rotation and/or movement may be recorded and monitored.

The first rotary measurement device 202 is fixedly connected to the second rotary measurement device 204 by a connecting linkage 214. The connecting linkage 214 may be a rigid connection between the first and second rotary measurement devices 202, 204. Operably connected to the first pivot 208 is a first probe linkage 216 and operably connected to the second pivot 212 is a second probe linkage 222. At an end of the first probe linkage 216, opposite the first rotary measurement device 202 is a first probe 218. The first probe 218 includes a respective first probe tip 220. At an end of the second probe linkage 222, and opposite the second rotary measurement device 204, is a second probe 224. The second probe 224 includes a respective second probe tip 226. Each of the first and second probe linkages 216, 222 may be structurally rigid. The first rotary measurement device 202 is configured to measure movement of the first probe linkage 216 about the first pivot 208, and the second rotary measurement device 204 is configured to measure movement of the second probe linkage 222 about the second pivot 212.

As shown in FIGS. 2B-2C, the wearable coordinate measurement device 200 is shown in different states or positions. As shown in FIG. 2B, a relatively small separation distance $D_0$ between the first probe tip 220 and the second probe tip 226 is shown. As a user, in this configuration, moves their forefinger (with the first probe linkage 216 operably connected thereto) and the thumb (with the second probe linkage 222 operably connected thereto) apart, the first and second probe tips 220, 226 will separate to a larger separation distance $D_0$ as shown in FIG. 2C. The separation distance Do is controlled by the user through movement of the user's fingers. That is, the wearable coordinate measurement device 200 is worn by and directly controlled by a user wearing the wearable coordinate measurement device 200.

Figure 3:
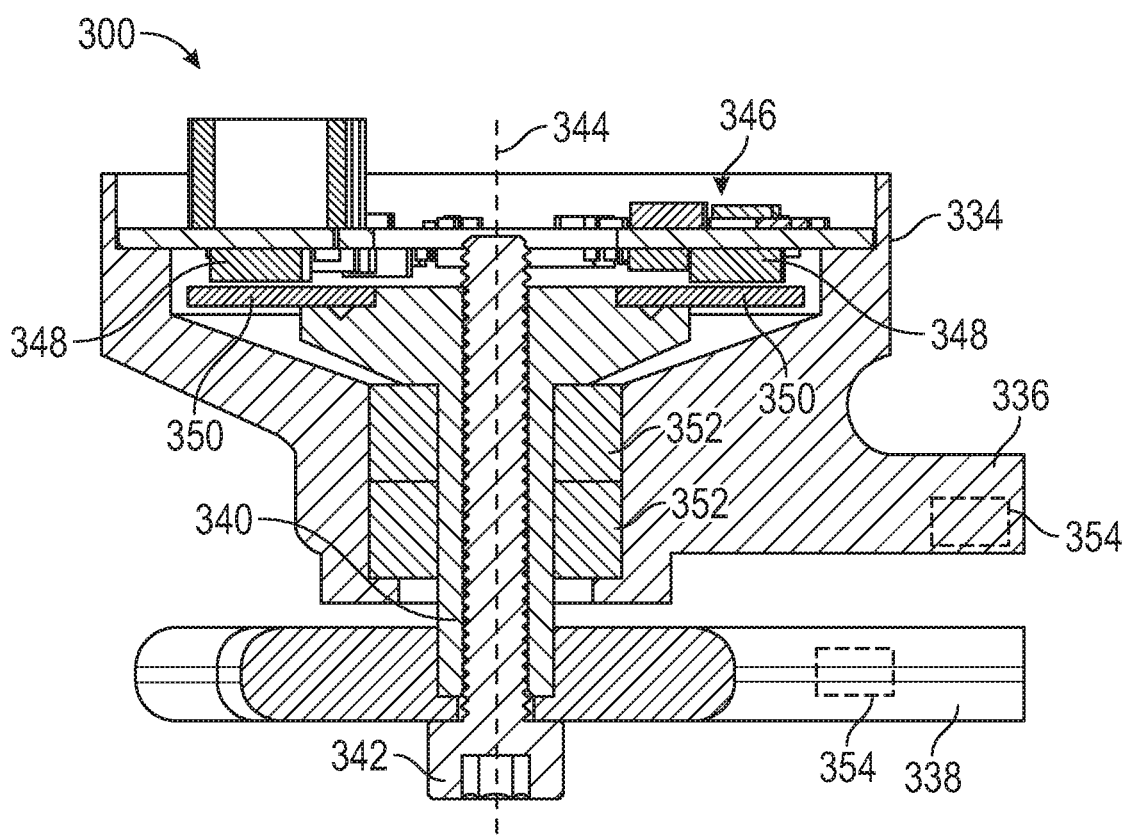
FIG. 3 is a partial cross-sectional illustration of a part of a wearable coordinate measurement device in accordance with an embodiment of the present disclosure.

Turning now to FIG. 3, a partial cross-sectional illustration of a portion of a wearable coordinate measurement device 300 in accordance with an embodiment of the present disclosure is shown. In FIG. 3, a measurement device 334 is shown. The measurement device 334, in this embodiment, is integrally formed with a connecting linkage 336 that rigidly connects the measurement device 334 to another measurement device, similar to that shown and described above. The measurement device 334 is also rotatably connected to a probe linkage 338 that extends to and terminates in a probe assembly and probe tip, as shown and described above. The measurement device 334 includes a shaft 340 that extends through the measurement device 334 and receives a fastener 342 to rotatably connect the measurement device 334 to the probe linkage 338. The fastener 342 defines an axis 344 about which relative movement (rotation) of the probe linkage 338 to the connecting linkage 336 can be measured.

The measurement device 334 further includes electronics 346. As shown, the electronics 346 include, at least, one or more read heads 348 that are arranged relative to an encoder disc 350. The encoder disc 350, in this embodiment, is operably connected to the shaft 340, and thus rotation of the shaft 340 causes rotation of the encoder disc 350. The read heads 348 are configured to detect and measure an amount of rotation of the encoder disc 350. The amount of rotation of the relative movement between the probe linkage 338 and the connecting linkage 336 enable measurement of an angle therebetween, and thus an input for calculation of a separation distance of two probe tips may be achieved. In this embodiment, one or more bearings 452 are arrange between the shaft 340 and the measurement device 334 to aid in the movement of the probe linkage 338 relative to the connecting linkage 336.

Also shown in FIG. 3 are one or more linkage sensors 354. The linkage sensors 354 may be arranged to detect a property of the linkages (e.g., of the probe linkage 338 and the connecting linkage 336). For example, the linkage sensors 354 may be thermal sensors that are configured to detect and monitor a temperature of the respective linkage 336, 338. By monitoring the temperature of the linkages 336, 338, thermal expansion or contraction of the material the forms the linkages 336, 338 may be monitored and thus compensated for during measurements. Other types of sensors may include, without limitation, vibration sensors, accelerometers, etc. Thus, enabling improved accuracy of a separation distance of two probe ends on the ends of different linkages.

Figure 4:
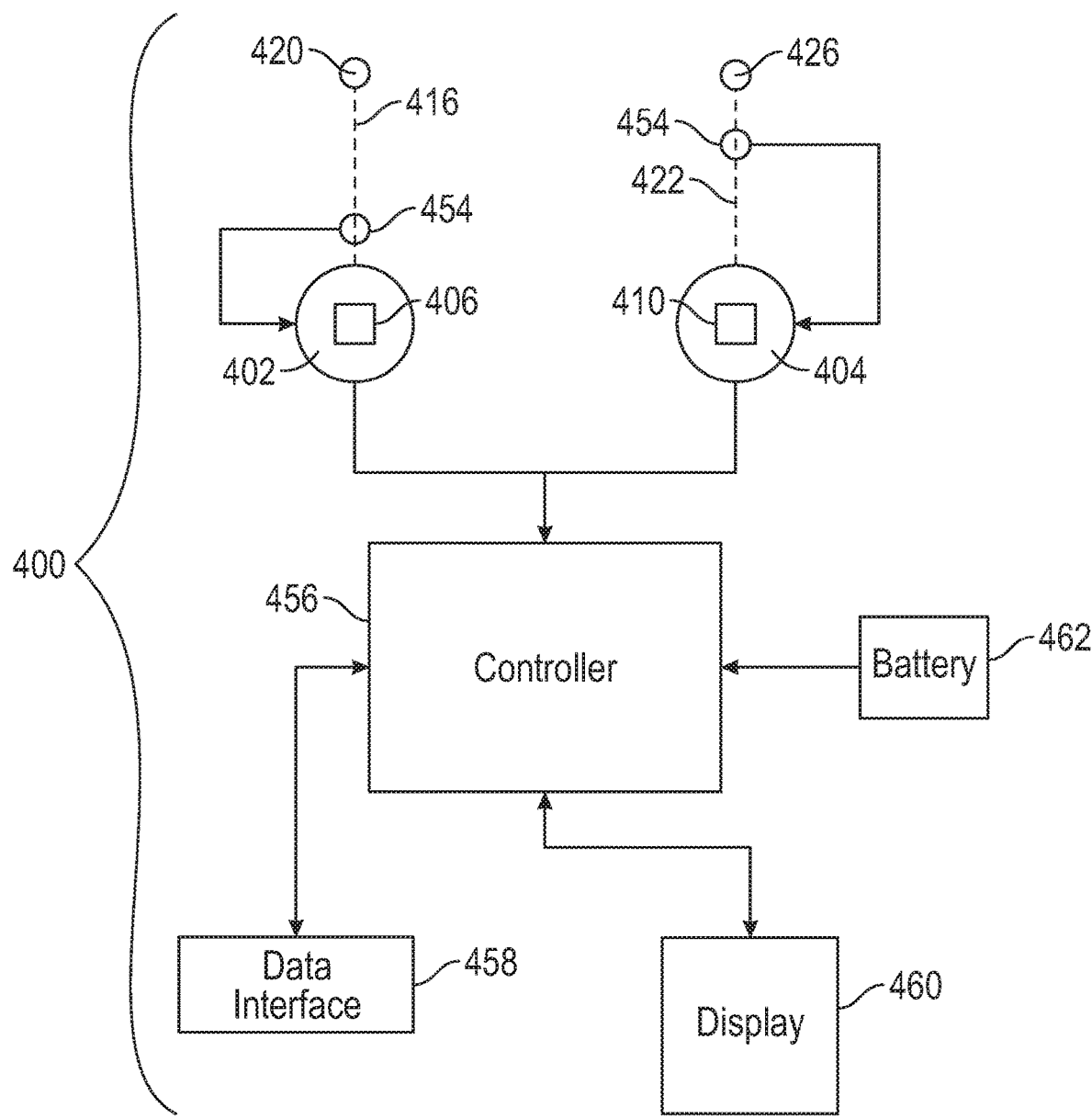
FIG. 4 is a schematic block diagram of a wearable coordinate measurement device in accordance with an embodiment of the present disclosure.

Turning now to FIG. 4, a schematic block diagram illustration of a wearable coordinate measurement device 400 in accordance with an embodiment of the present disclosure is shown. The wearable coordinate measurement device 400 may be similar to the configurations shown and described above, or variations thereof. The wearable coordinate measurement device 400 includes a first rotary measurement device 402 and a second rotary measurement device 404. The first rotary measurement device 402 is configured to provide information regarding a position of a first probe tip 420 and the second rotary measurement device 404 is configured to provide information regarding a position of a second probe tip 426. The first and second rotary measurement devices 402, 404 may monitor and detect angular information regarding rotation of the first and second probe tips 420, 426, respectively. The first probe tip 420 may be arranged at an end of a first probe linkage 416 and the second probe tip 426 may be arranged at an end of a second probe linkage 422. Arranged along the first and second probe linkages 416, 422 may be one or more linkage sensors 454 (e.g., thermal sensors, vibration sensors, accelerometers, etc.).

Each of the first and second rotary measurement devices 402, 404 may include electronics 406, 410 for monitoring movement of the first and second probe tips 420, 426, respectively. The electronics 406, 410 may include various electronic components, including, without limitation, resistors, transistors, capacitors, storage media, processing components (e.g., microprocessor), input/output components, buses, etc., as will be appreciated by those of skill in the art. in some embodiments, the electronics 406, 410 may be printed circuit boards. The electronics 406, 410 may include encoders arranged to detect rotational movement, as described above.

In this embodiment, the first and second rotary measurement devices 402, 404 are arranged in data communication and/or electrical communication with a controller 456. In this configuration, the controller 456 is an integral part of the wearable coordinate measurement device 400 (e.g., mounted on the material of a wearable member of the wearable coordinate measurement device 400). The controller 456 may have various electronic components, including, without limitation, resistors, transistors, capacitors, storage media, processing components (e.g., microprocessor), input/output components, buses, etc. In some embodiments, some elements of the controller 456 may be duplicated within the first and second rotary measurement devices 402, 404, and in other embodiments the controller 456 or the first and second rotary measurement devices 402, 404 may provide specific and distinct functionality. In one non-limiting example, such as when the wearable member is a glove, the measurement devices 402, 404 (with encoders) may be arranged at the knuckle of a user, and the controller may be mounted proximate the back of the hand of the user.

In this embodiment, the controller 456 is configured to receive data from the first and second rotary measurement devices 402, 404, and from the linkage sensors 454 (through the first and second rotary measurement devices 402, 404 or directly from the linkage sensors 454). The controller 456 may further be in communication with or include a data interface 458. The data interface 458 may be a wired or wireless connection to enable transmission and/or receipt of digital information through the data interface 458. For example, the data interface 458 can enable transmission of coordinate data from the controller 456 to a general purpose computer (not shown). The wearable coordinate measurement device 400 of this embodiment further includes a display 460. The display, in the present descriptive arrangement, for example, may be arranged along a forearm of a user. Also provided in this configuration is a battery 462 that is arranged to provide power to the various electrical components of the wearable coordinate measurement device 400.

Although shown as a single unitary device in this embodiment, one or more of the elements may be separate from the wearable coordinate measurement device. For example, in some embodiments, a display may be arranged on one of the linkages of the wearable coordinate measurement device, on the wearable portion thereof, or located remote from the wearable coordinate measurement device. Similarly, in some embodiments, the controller may be separated from the wearable coordinate measurement device, either worn elsewhere, or entirely remote, and connected by wires or wireless to the wearable coordinate measurement device.

Although shown and described above as having two measurement devices, such number is not to be limiting. For example, in one alternative configuration, one measurement device and the connecting linkage may be eliminated. In such embodiment, for example, a single measurement device is arranged to monitor and detect relative movement and an angle of separation of two rigid probe linkages that are rotatably connected to the single measurement device (e.g., scissor-like configuration). Further, in other embodiment, more than two measurement devices may be employed, thus providing additional aspects of movement and/or rotation. For example, a measurement device may be arranged at each knuckle or joint on a user's hand.

Figure 5:
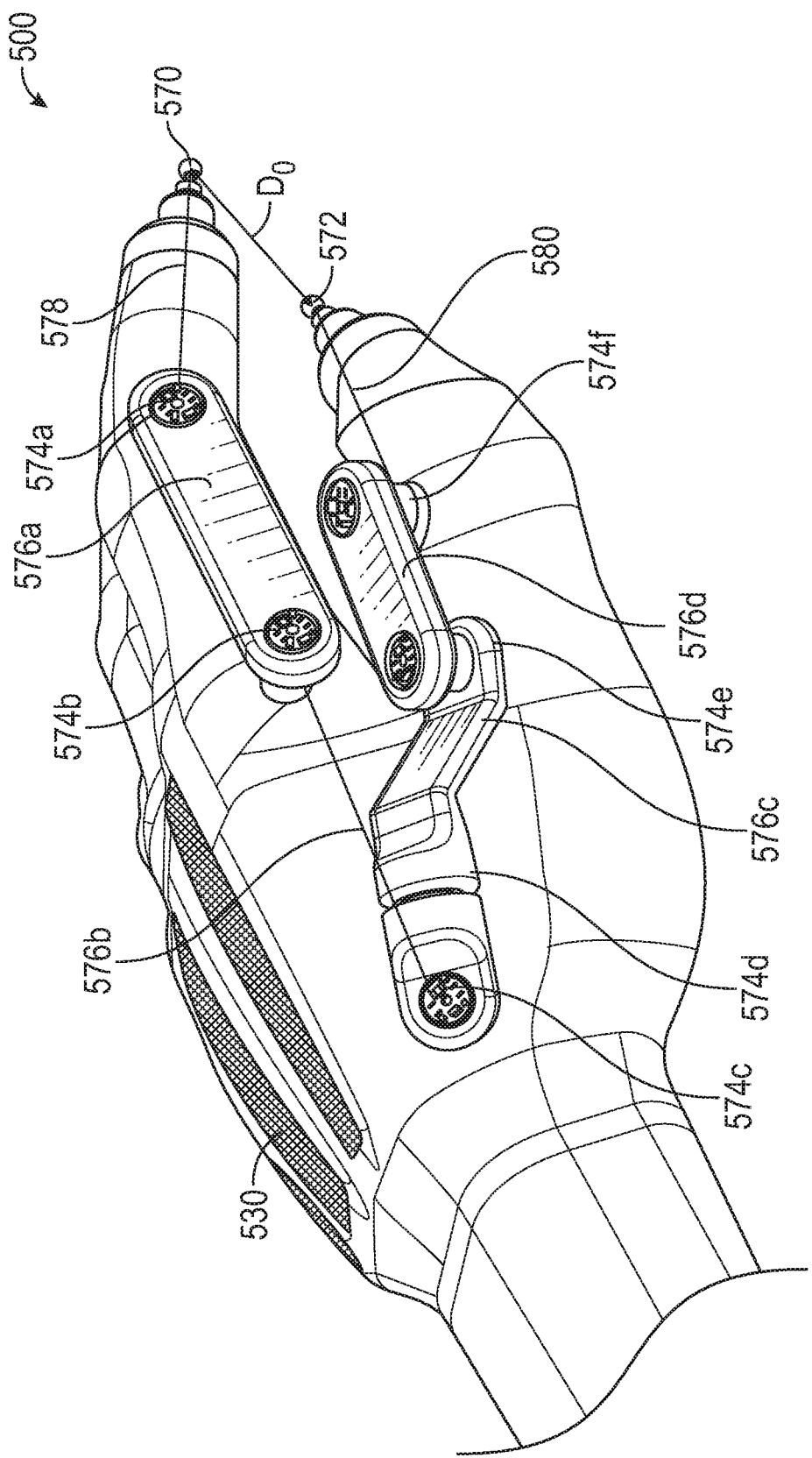
FIG. 5 is a schematic illustration of a wearable coordinate measurement device in accordance with an embodiment of the present disclosure.

For example, turning now to FIG. 5, a wearable coordinate measurement device 500 in accordance with an embodiment of the present disclosure is shown. The wearable coordinate measurement device 500 may be similar to the above described wearable coordinate measurement devices, but includes more than two measurement devices (e.g., encoders) distributed about a wearable member 530. The wearable coordinate measurement device 500 is configured to enable a user wearing the wearable coordinate measurement device 500 to measure a separation distance $D_0$ between a first probe tip 570 and a second probe tip 572.

The wearable coordinate measurement device 500 includes six (6) measurement devices 574a, 574b, 574c, 574d, 574e, 574f A number of connecting linkages 576a, 576b, 576c, 576d are provided to rigidly and fixedly connect some of the measurement devices 574a, 574b, 574c, 574d, 574e, 574f, as illustratively shown. Further, a first probe linkage 578 fixedly and rigidly connects the first probe end 570 to one of the measurement devices 574a. Similarly, a second probe linkage 580 fixedly and rigidly connects the second probe end 572 to one of the measurement devices 574f. As shown, the different measurement devices 574a, 574b, 574c, 574d, 574e, 574f may provide for measuring rotational movement in different planes or orientations. As such, a detailed and accurate movement tracking of motion of a user's hand, and thus the separation distance $D_0$, may be achieved. It is noted that in some embodiments, one or more of the connecting linkages and/or the probe linkages may be integrated into and/or integrally formed within the wearable member 530. For example, the probe linkages may be provided by rigid structures or elements that fit over the ends of a user's hand/fingers (e.g., similar to a thimble).

Figure 6:
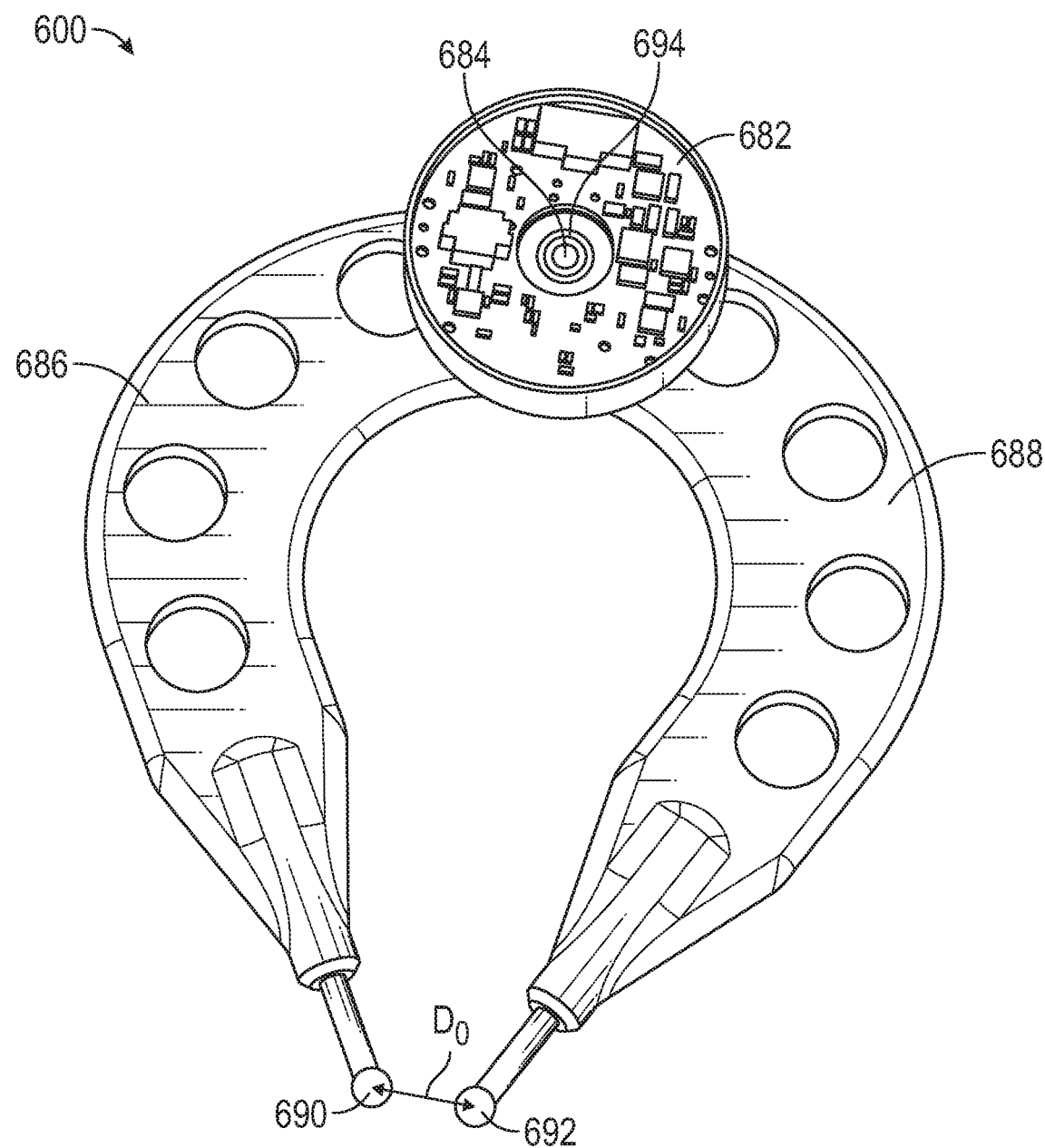
FIG. 6 is a schematic illustration of a wearable coordinate measurement device in accordance with an embodiment of the present disclosure.

Turning now to FIG. 6, a wearable coordinate measurement device 600 in accordance with an embodiment of the present disclosure is shown. The wearable coordinate measurement device 600 may be similar to the above described wearable coordinate measurement devices but includes only a single measurement device 682 (e.g., encoder) located about a single pivot 684. The wearable coordinate measurement device 600 is configured to enable a user wearing the wearable coordinate measurement device 600 to measure a separation distance $D_0$ between a first probe tip 690 and a second probe tip 692. The first probe tip 690 is arranged at the end of a first probe linkage 686 and the second probe tip 692 is arranged at the end of a second probe linkage 688, with the first and second probe linkages rotatable about the pivot 692 of the measurement device 682.

Also shown in FIG. 6, the wearable coordinate measurement device 600 may include a preloading mechanism 694 to provide the same amount of force from the probe tips 690, 692 to an object to be measured, no matter what the size of the object is. In one example embodiment, the preloading mechanism 694 may be a clock spring arranged inside the measurement device 682 (e.g., an encoder area). Other types of preloading and/or biasing elements or mechanisms may be implemented without departing from the scope of the present disclosure. In some embodiments, the preloading mechanism may be configured to apply a closing force, such that the probe tips are urged toward each other.

As shown and described above, a wearable coordinate measurement device is provided that enable precise and accurate measurement of a separation distance between two probe tips that are part of the wearable coordinate measurement device. Any number of measurement devices can be employed to provide for measurement of the separation distance and/or a position of the probe tips within a three dimensional coordinate system.

The probe tips of the present disclosure may be hard probes that are able to be positioned in contact of an object to be measured. When in contact with the object to be measured, an accurate separation distance between the centers of the probe tips may be measured. In some embodiments, the probe tips may be spherical.

As discussed above, the linkages (probe linkages and connecting linkages) may be configured for rigid or stiff connection between elements. Such rigid and stiff connection enables an accurate measurement of the separation distance, by ensuring that potential variables, variations, and unknowns are minimized. In some embodiments, the linkages may be made from aluminum, magnesium, carbon fiber, or other structurally rigid material. Further, as noted above, if the linkages may be prone to thermal conditions (e.g., thermal expansion or contraction), sensors may be embedded into or arranged relative to the linkages to enable monitoring such thermal conditions, and thus allowing for accounting for, minimizing, or eliminating such expansion/contraction as a factor that can influence the measurement of the separation distance between probe tips.

Although described as a wearable coordinate measurement device 600, in some embodiments, the coordinate measurement device 600 may be a handheld component that is not worn, but rather is hand operated. That is the structure and device shown in FIG. 6 may be employed as a stand-alone or non-worn/non-wearable device. Further, in some embodiments, the device shown and described with respect to FIG. 6 may be configured to be removably mounted on a wearable element (e.g., a glove), such that the device can be used by free-hand or may be worn.

Figure 7:
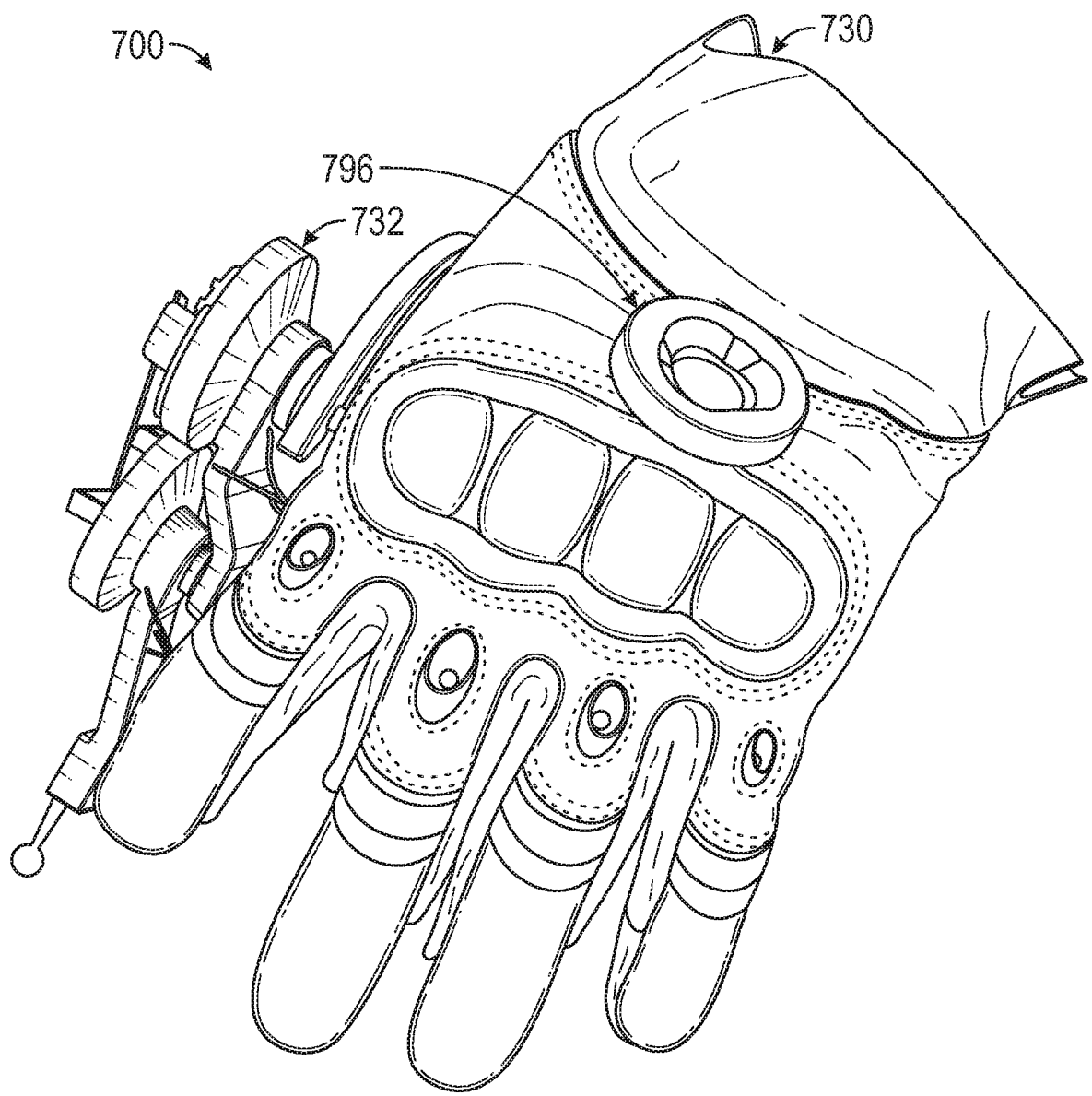
FIG. 7 is a schematic illustration of a wearable coordinate measurement device in accordance with an embodiment of the present disclosure.

In addition to providing measurement of the separation distance between the probe tips of the wearable coordinate measurement device, as discussed above, the wearable coordinate measurement devices of the present disclosure may also provide position information within a three dimensional coordinate system. For example, as shown in FIG. 7, a wearable coordinate measurement device 700 is shown, including a wearable member 730 and a measurement portion 732. The measurement portion 732 can include one or more measurement devices and two probe tips to measure a separation distance therebetween. The measurement portion 732 may be mounted, attached, affixed, or integrally formed with the wearable member 730.

Additionally, the wearable coordinate measurement device 700 may include one or more auxiliary components 796. The auxiliary components 796 may be mounted, attached, affixed, or integrally formed with the wearable member 730. The auxiliary components 796 can include, for example and without limitation, retroreflectors, laser tracker elements, electrical and/or communication connectors, interface elements/connectors, tracking elements, etc. When tracking elements (e.g., retroreflectors, laser tracker elements, stickers, LED elements, etc.) are employed, the wearable coordinate measurement device 700 may be tracked within a three dimensional coordinate space, as will be appreciated by those of skill in the art. Electrical and/or communication connectors and/or interface elements/connectors can enable integration with a larger coordinate measurement system. For example, such elements and components can enable integration with an AACMM or other coordinate measurement system.

Embodiments of the present disclosure may be employed in a variety of industries. For example, without limitation, wearable coordinate measurement devices as described herein may be used in automotive, aerospace, tool and die, metal fabrication, and medical industries to provide for precise and accurate measurements (whether a separation distance and/or measurements within a three dimensional coordinate space).

Advantageously, embodiments of the present disclosure are directed to wearable coordinate measurement devices that enable a user to make measurements with accuracy while wearing the wearable coordinate measurement device. The wearable coordinate measurement devices may be sized, shaped, and otherwise configured to be worn by a user, such as a user's hand. As such, the user can easily manipulate and take measurements with the wearable coordinate measurement device.

Various embodiments, advantageously, include different sensors and/or components to enable improved measurement and/or inclusion and integration with more expansive coordinate measurement systems. Various sensors and electronics of the wearable coordinate measurement devices may be fully integrated into the wearable member of the wearable coordinate measurement device, thus providing for versatile, mobile, and accurate measurements.

As compared to prior measurement devices providing similar functionality, i.e., measuring a separation distance between two points/probes, embodiments described herein can provide for reduced costs, improved accuracy, ease of use, portability, lightweight, and multiple formats of integration (e.g., AACMM, laser tracker, target tracking, etc.).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced items.

What is claimed:

1. A wearable coordinate measurement device comprising:
   a wearable member; and
   a measurement portion attached to the wearable member, the measurement portion comprising:
   a first rotary measurement device;
   a first probe linkage having a first probe tip on an end thereof;
   a second probe linkage having a second probe tip on an end thereof; and
   wherein the first rotary measurement device is configured to detect a separation distance between the first probe tip and the second probe tip.

2. The wearable coordinate measurement device of claim 1, wherein the first rotary measurement device defines a pivot and the first and second probe linkages are arranged to rotate about the pivot and wherein the measurement device is configured to measure and angle between the first probe linkage and the second probe linkage relative to the pivot.

3. The wearable coordinate measurement device of claim 1, further comprising a second rotary measurement device, wherein the first probe linkage is movably attached to the first rotary measurement device and the second probe linkage is movable attached to the second rotary measurement device.

4. The wearable coordinate measurement device of claim 3, further comprising a connecting linkage fixedly connecting the first rotary measurement device to the second rotary measurement device.

5. The wearable coordinate measurement device of claim 1, further comprising a plurality of additional measurement devices arranged between the first probe linkage and the second probe linkage.

6. The wearable coordinate measurement device of claim 1, wherein the wearable member is sized to fit an operator's hand.

7. The wearable coordinate measurement device of claim 1, wherein the measurement portion is integrally formed with the wearable member.

8. The wearable coordinate measurement device of claim 1, wherein the measurement portion is fixedly attached to the wearable member.

9. The wearable coordinate measurement device of claim 1, wherein the measurement portion is removably attached to the wearable member.

10. The wearable coordinate measurement device of claim 1, wherein the first probe linkage is formed from at least one of aluminum, magnesium, and carbon fiber.

11. The wearable coordinate measurement device of claim 1, further comprising a controller operably connected to the first rotary measurement device, the controller configured to receive data from the first rotary measurement device.

12. The wearable coordinate measurement device of claim 11, wherein the controller is mounted to the wearable member.

13. The wearable coordinate measurement device of claim 1, further comprising at least one linkage sensor, the linkage sensor configured to detect a characteristic of the first probe linkage.

14. The wearable coordinate measurement device of claim 13, wherein the at least one linkage sensor is embedded within the first probe linkage.

15. The wearable coordinate measurement device of claim 13, wherein the at least one linkage sensor is a thermal sensor.

16. The wearable coordinate measurement device of claim 1, further comprising at least one auxiliary component attached to the wearable member.

17. The wearable coordinate measurement device of claim 16, wherein the at least one auxiliary component comprises at least one tracking element.

18. The wearable coordinate measurement device of claim 17, wherein the at least one tracking element is detectable to enable monitoring a position of the wearable member within a three dimensional coordinate space.

19. The wearable coordinate measurement device of claim 16, wherein the at least one auxiliary component comprises at least one of an electrical connector, a communication connector, and an interface connector.

20. The wearable coordinate measurement device of claim 16, wherein the at least one auxiliary component enables integration with an articulated arm coordinate measuring machine.

21. The wearable coordinate measurement device of claim 1, wherein the measurement device comprises an encoder to measure an angle.

22. The wearable coordinate measurement device of claim 1, further comprising a battery mounted to the wearable member, the battery configured to supply power to the first rotary measurement device.

23. The wearable coordinate measurement device of claim 1, further comprising a preloading mechanism arranged to urge the first probe tip toward the second probe tip.

24. The wearable coordinate measurement device of claim 23, wherein the preloading mechanism is a clock spring arranged within the first rotary measurement device.

* * * * *